July 18, 1933.  E. H. LAND ET AL  1,918,848
POLARIZING REFRACTING BODIES
Filed April 26, 1929
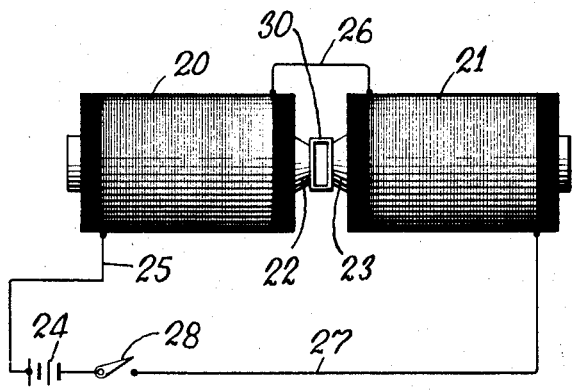
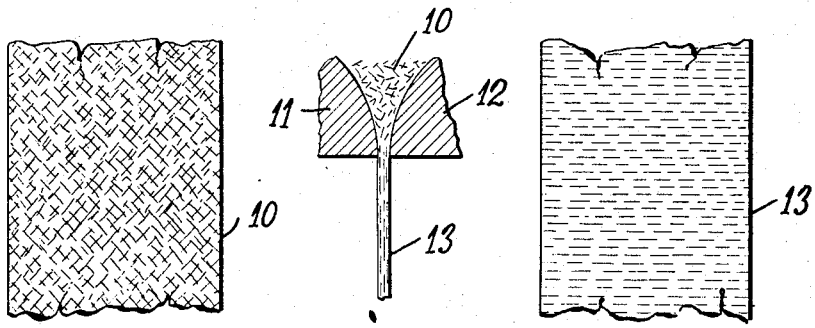
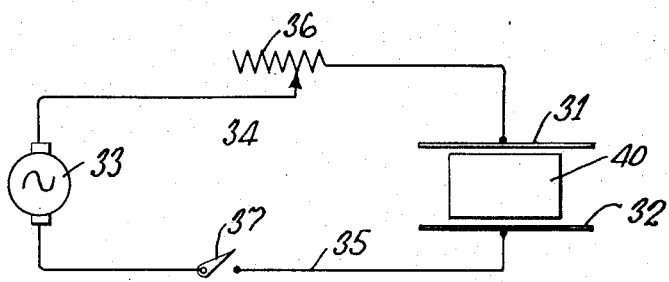
Inventor
Edwin H. Land
and
Joseph S. Friedman
By their Attorneys
Warfield & Watson Patented July 18, 1933

1,918,848

UNITED STATES PATENT OFFICE

EDWIN H. LAND, OF NORWICH, CONNECTICUT, AND JOSEPH S. FRIEDMAN, OF BROOKLINE, MASSACHUSETTS, ASSIGNORS TO NORWICH RESEARCH, INC., OF NEW YORK, N. Y., A CORPORATION OF NEW YORK

POLARIZING REFRACTING BODIES

Application filed April 26, 1929. Serial No. 358,288.

This invention relates to polarizing refracting bodies, and particularly to polarizing bodies made from suspensions containing polarizing crystals.

The invention has for its object generally an improved polarizing body which may be produced in a convenient and efficient manner, and which is readily adapted to manufacturing procedure.

More specifically the invention has for its object the provision of an improved refracting body of solid material containing properly orientated polarizing bodies such as crystals which are dichroic and substantially transparent.

Other objects of the invention will in part be obvious and will in part appear hereinafter.

The invention accordingly comprises the article possessing the features, properties and the relation of elements, which are exemplified in the following detailed disclosure, and the scope of the application of which will be indicated in the claims.

For a fuller understanding of the nature and objects of the invention, reference should be had to the following detailed description taken in connection with the accompanying drawing, in which:

Fig. 1 is a view mainly diagrammatic, showing elementary apparatus adapted for carrying out the process of the present invention;

Fig. 2 is a fragmentary view of the medium showing its condition before treatment in accordance with the present invention;

Fig. 3 is a similar fragmentary view showing the condition of the medium after treatment;

Fig. 4 is a schematic view showing means employing a magnetic field of force for carrying out the process of the invention; and Fig. 5 is a similar view showing means employing an electric field of force for carrying out the process of the invention.

In accordance with the present invention, a refracting polarizing body is produced by forming a colloidal suspension containing a mass of relatively small polarizing bodies which are oriented in a field of force so that the polarizing axes of the polarizing bodies are in alignment, or substantially parallel, whereby a body having permanent refracting and polarizing properties is obtained when the colloidal mass is set or hardened.

The polarizing bodies here preferably employed are relatively small crystals which are dichroic and transparent, and can be produced commercially in large quantities with substantial uniformity of size and other properties. It is generally desirable to employ colorless crystals, for example, small crystals of herapathite (sulphate of iodoquinine).

Herapathite crystals commonly occur in two modifications, generally designated alpha and beta varieties. Care should be taken to use only one variety in the suspension when prepared for mechanical treatment, as the geometric disposition of the polarizing axes in the two varieties is different. Crystals of herapathite of but one variety, however, result from any standard method of preparation.

The crystals which are preferred, when the orientation is to be accomplished by mechanical means as hereinafter set forth, are relatively small and needle-shaped, having one dimension longer than the others, for example, crystals with a width of 600 $\mu\mu$ (micromicrons) and a longitudinal dimension of 1 to 2 $\mu$ (microns).

A crystal-containing suspension is made by providing a suspending medium of proper viscosity, in which the crystals are introduced, the medium serving as a protecting agent adapted to prevent any tendency of the suspended crystals to flocculate. Suitable colloids for this purpose are the cellulose esters, particularly cellulose nitrate. The crystal-forming reaction may, with advantage, be made to take place in the colloidal mass itself. This is particularly true where it is desired to form needle-like crystals.

The following is an example of the manner in which a crystal-containing suspension of a character adapted to produce long crystals is prepared:

To 5 grams of nitrocellulose of low nitration dissolved in enough butyl acetate to make it plastic is added 1 gram of bisulphate of quinine, which has been dissolved in 2 cc. of methyl alcohol. This is worked to insure substantially uniform distribution of the bisulphate of quinine throughout the mass and is brought down substantially to its original plasticity. To this plastic material is then added 2.5 cc. of a 20% iodine solution dissolved in methyl alcohol. When this has been properly worked so as to bring about the crystal-forming reaction, it will be found to have substantially uniformly dispersed throughout the mass relatively fine needle-like crystals of herapathite.

The crystals thus dispersed throughout the colloidal mass have initially substantially all orientations of their polarizing axes, and form, in the first instance, only an opaque mass. In order to convert this mass into a transparent polarizing body, a quantity of the crystal-containing suspension supported in any suitable manner, and subjected to a field of force to which it is susceptible or to a system of constraints whereby differential velocities are produced throughout the mass by friction-applying means, as shown in Fig. 1.

Referring specifically to Fig. 1, 10 denotes a colloidal mass containing polarizing crystals having their polarizing axes disposed at random. This mass is shown as extruded between die-members 11 and 12, which apply frictional force to the sides of the extruded mass and thereby cause, by the stroking action, an orientation of the long crystals so that their geometrical and polarizing axes all point substantially in the same direction.

The extruded colloidal mass containing the oriented polarizing bodies is then allowed to become set by drying so that the resultant body is relatively hard and permanently has the property of polarizing light. When set, the polarizing particles are immovably embedded in and protected by the dried suspending medium in which they are positioned.

The die-members and the mass 10 in Fig. 1 may be deemed to show the parts greatly magnified as the die-members in practice are spaced apart a distance not much greater than the least dimension of the polarizing bodies (plus any support for the colloid that may be passed through the die-members). The polarizing crystals which have one dimension materially greater than the others, are thus susceptible to a mechanical application of force when stroked, which effects their desired orientation.

In Fig. 2 is shown schematically a strip of the colloidal suspension containing the polarizing bodies before being subject to a field of force, while Fig. 3 similarly shows the condition after such subjection, for example, after being stroked or extruded; the stippling or broken lines in Fig. 2 being employed to indicate that polarizing axes of the polarizing bodies have all orientations. In Fig. 3, the broken lines indicate that these axes have been brought into the substantial alignment or parallelism which imparts polarizing properties to the body. The condition of the medium shown in Figs. 2 and 3 may be regarded as enlarged views, showing rectangular sections taken in the plane of the paper from Fig. 1; Fig. 2 being taken from the portion of the medium shown at 10, while that in Fig. 3 lies in the plane of the paper and is taken from the portion 13.

Fields of force may be employed to accomplish the crystal orientation desired equally well, for example, magnetic and electric, since crystals in general have properties which make them susceptible to such fields of force. The unequal permeabilities of crystals respectively along the major crystal axes, make them susceptible to orientation by magnetic forces, while the similar phenomenon with respect to electric permeabilities along the crystal axes make them susceptible to electric fields. Small crystals of herapathite which are relatively geometrically symmetric, are readily oriented by suitable magnetic and electric fields.

Colloidal suspensions containing relatively small geometrically symmetric crystals which are particularly susceptible to magnetic and electric fields, are produced by grinding the crystals which have been previously obtained from solutions by supersaturation in any convenient manner, for example, by the Jörgensen method as described in "Journal für Praktische Chemie", Series 2, vol. 14, p. 230. This grinding appears to secure substantially uniform small size and distribution of the crystals in the colloidal mass. The following is an example of the manner in which such a crystal-containing suspension is made:

Two stock solutions are first prepared, as follows:

Solution No. 1, comprising ethyl acetate 80% and butyl acetate 20%; and

Solution No. 2, comprising 420 cubic centimeters of solution No. 1, to which is added 100 grams of one-half-second cellulose nitrate.

To make a convenient amount of the desired suspension, one takes 800 cubic centimeters of solution No. 1 and adds thereto 300 cubic centimeters of solution No. 2, and then introduces 2 grams of herapathite crystals. When made, this mass is ground by suitable means, for example, by a pebble-grinding machine, for a period of from 84 to 96 hours. At this juncture, it is desirable to introduce about 100 cubic centimeters of solution No. 2 and to continue the grinding for another period, for example, five hours or more. When the grinding is finished, the crystal-containing suspension may be further conditioned by adding a so-called "plasticizing agent", for example, di-butyl phthalate. The quantity of this latter agent that is added to a mass of the proportions given above is taken as substantially 30% by weight of the cellulose-nitrate introduced.

A suitable arrangement for applying a magnetic field of force to such a crystal-containing suspension, is shown in Fig. 4, where 20 and 21 denote windings or coils of electromagnets, which have opposed core members 22 and 23 of magnetic materials, which preferably have relatively high permeabilities; the electromagnets shown being of the open-magnetic circuit type. The windings of electromagnets are energized by an electric circuit which is here symbolically depicted as having a source of E. M. F. at 24, and conductors 25, 26 and 27, connected in series and controlled by a switch 28.

The electromagnets here employed are of a character adapted to produce a relatively intense magnetic field between the core members 22 and 23. A suitable field for this purpose has a flux density of at least 10,000 gauss. A frame 30 is shown between the opposed core members which is adapted to support a crystal-containing suspension prepared in accordance with the present invention for treatment in the magnetic field. After the insertion of the support 30, the field is energized by closing the switch 28, this field being applied until the colloid has dried or set. If desired, the colloid and its support may be moved for progressive treatment through the field.

In Fig. 5 there is shown schematically an arrangement of means for accomplishing the desired orientation of the polarizing crystals by an electric field of force. Here 31 and 32 denote respectively the plates of air-condenser between which an intense electrostatic field is arranged to be produced and employed as an orienting agent in accordance with the present invention. This condenser is energized from any suitable source of E. M. F., preferably a high potential alternating current source, since a direct-current source would tend to cause migration of the polarizing crystals from one portion of the suspension to another, which is not desired, this being due, apparently, to the fact that the crystals carry small charges so that they act like slow-moving ions. A source of alternating current is indicated at 33 and has electrical conductors 34 and 35 connecting the same to the plates 31 and 32. An impedance for regulating the intensity of the impressed E. M. F. is shown at 36.

A circuit-controlling means is also shown at 37. The support in this case which is adapted to contain the colloidal material for treatment, is shown at 40, the colloid containing the polarizing crystals in suspension. Here the orientation is accomplished by means of the change in the relatively different electrical permeativities of the polarizing crystals along their respective crystal axes. An alternating current of too low a frequency should be avoided.

In all the examples above described as methods of applying the field of force to orient the polarizing crystals in the colloidal suspension, the crystals are seen to have a physical property which is susceptible to the field of force to be applied. In the case of mechanical constraints the crystals have a geometrical dimension which is acted upon by the force applied frictionally to produce the desired orientation. When the magnetic field is employed, the crystals appear to move in the suspension so that their axis of maximum permeability lies along the lines of magnetic flux. In like manner, in the electric field, the crystals move so that their polarizing axes are substantially aligned.

Since certain changes in carrying out the above process, and certain modifications in the articles which embody the invention may be made without departing from its scope, it is intended that all matter contained in the above description or shown in the accompanying drawing shall be interpreted as illustrative and not in a limiting sense.

Having described our invention, what we claim as new and desire to secure by Letters Patent, is:

1. A polarizing refracting body, comprising a set transparent suspending medium of colloidal origin, and a plurality of granular crystalline bodies having their polarizing axes oriented to be in substantial parallelism and dispersed substantially uniformly through said medium and immovably embedded therein, the set suspension being adapted to retain its polarizing properties independent of external support.

2. A polarizing refracting body, comprising a set transparent suspending medium of colloidal origin, and a plurality of relatively small transparent dichroic crystals having their polarizing axes oriented into substantial parallelism and dispersed substantially uniformly through said medium and immovably embedded therein, the set suspension being adapted to retain its polarizing properties independent of external support.

3. A polarizing refracting body, comprising a set transparent suspending medium of colloidal origin, and a plurality of relatively fine crystals of herapathite having their polarizing axes oriented into substantial parallelism and dispersed substantially uniformly throughout the said medium and immovably embedded therein, the set suspension being adapted to retain its polarizing properties independent of external support.

4. A polarizing refracting body, comprising a set transparent suspending medium containing a cellulose ester, and a plurality of transparent dichroic crystals having their polarizing axes oriented into substantial parallelism and dispersed substantially uniformly throughout said ester and immovably embedded therein, the set suspension being adapted to retain its polarizing properties independent of external support.

5. A polarizing refracting body, comprising a set transparent suspending medium containing cellulose nitrate, and a plurality of crystals of herapathite having a dimension in the neighborhood of 600 $\mu\mu$ dispersed substantially uniformly throughout said medium and immovable embedded therein and having their polarizing axes oriented into substantial parallelism, the set suspension being adapted to retain its polarizing properties independent of external support.

6. A polarizing refracting body, comprising a set transparent suspending medium containing cellulose nitrate, and a plurality of relatively fine needle-like crystals of herapathite having their polarizing axes oriented into substantial parallelism and dispersed substantially uniformly throughout said medium and immovably embedded therein, the set suspension being adapted to retain its polarizing properties independent of external support.

7. A polarizing body, comprising a set suspending medium and a plurality of bodies immovably embedded therein having their polarizing axes oriented to be in substantial parallelism, the set suspension being adapted to retain its polarizing properties independent of external support.

8. A polarizing body comprising a set suspending medium having relatively small transparent polarizing bodies dispersed and immovably embedded therein with their polarizing axes oriented to be in substantial parallelism, the set suspension being adapted to retain its polarizing properties independent of external support.

9. A polarizing body comprising a set suspending medium having herapathite particles dispersed and immovably embedded therein with their polarizing axes oriented to be in substantial parallelism, the set suspension being adapted to retain its polarizing properties independent of external support.

EDWIN H. LAND.
JOSEPH S. FRIEDMAN.